(12) United States Patent
Lin et al.

(10) Patent No.: US 11,640,097 B2
(45) Date of Patent: May 2, 2023

(54) TOTAL INTERNAL REFLECTION DISPLAY

(71) Applicant: AU Optronics Corporation, Hsin-Chu (TW)

(72) Inventors: Chun-Yu Lin, Hsin-Chu (TW); Kun-Cheng Tien, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 17/513,150

(22) Filed: Oct. 28, 2021

(65) Prior Publication Data

US 2023/0052419 A1 Feb. 16, 2023

(30) Foreign Application Priority Data

Aug. 13, 2021 (TW) ................. 110130000

(51) Int. Cl.
| | |
|---|---|
| *G02F 1/167* | (2019.01) |
| *G02F 1/1676* | (2019.01) |
| *G02F 1/16766* | (2019.01) |
| *G02F 1/1677* | (2019.01) |
| *G02F 1/1335* | (2006.01) |
| *G09G 3/34* | (2006.01) |

(52) U.S. Cl.
CPC ........ *G02F 1/167* (2013.01); *G02F 1/133512* (2013.01); *G02F 1/133514* (2013.01); *G02F 1/1676* (2019.01); *G02F 1/1677* (2019.01); *G02F 1/16766* (2019.01); *G09G 3/344* (2013.01)

(58) Field of Classification Search
CPC .... G02F 1/167; G02F 1/1676; G02F 1/16766; G09G 3/344
See application file for complete search history.

(56) References Cited

U.S. PATENT DOCUMENTS

| | | | |
|---|---|---|---|
| 6,483,562 B1 | 11/2002 | Fukuyoshi et al. | |
| 2012/0262777 A1* | 10/2012 | Lee | G02F 1/167 359/296 |
| 2014/0184984 A1 | 7/2014 | Kim et al. | |
| 2017/0287406 A1 | 10/2017 | Whitehead | |
| 2018/0088411 A1 | 3/2018 | Zhang | |
| 2019/0107765 A1 | 4/2019 | Whitehead et al. | |
| 2020/0209678 A1 | 7/2020 | Hsu et al. | |

FOREIGN PATENT DOCUMENTS

| | | | |
|---|---|---|---|
| CN | 101160547 A | | 4/2008 |
| CN | 105589252 A | * | 5/2016 |

* cited by examiner

*Primary Examiner* — Jessica M Merlin
(74) *Attorney, Agent, or Firm* — WPAT, PC

(57) ABSTRACT

A total internal reflection display includes a sub-pixel, a reflecting layer, at least one first stereoscopic electrode and a display medium layer. The sub-pixel is defined by a color filter and a black matrix disposed adjacently to the color filter. The reflecting layer is located beneath the sub-pixel. The first stereoscopic electrode is located beneath the black matrix. The width of the first stereoscopic electrode is less than the width of the black matrix. The display medium layer is located between the sub-pixel and the reflecting layer. The height of the first stereoscopic electrode is greater than half of the thickness of the display medium layer.

13 Claims, 9 Drawing Sheets

TOTAL INTERNAL REFLECTION DISPLAY

RELATED APPLICATION

This application claims priority to Taiwan Application Serial Number 110130000, filed Aug. 13, 2021, which is herein incorporated by reference in its entirety.

BACKGROUND

Field of Invention

The present disclosure relates to a total internal reflection display.

Description of Related Art

In general, a total internal reflection display usually has a lens layer and a display medium layer, and a total internal reflection display may control a movement direction of charged black particles in the display medium layer by a transparent electrode. For example, when a transparent electrode on a surface of the lens layer is positive, the charged black particles in the display medium layer move upward to absorb light, which may be viewed as a dark state of the total internal reflection display. When a transparent electrode of a thin-film transistor substrate is positive, the charged black particles in the display medium layer move downward such that the lens layer reflects the light, which may be viewed as a bright state of the total internal reflection display. However, because the transparent electrode of the thin-film transistor substrate is not effective in absorbing the charged black particles, the lens layer may not reflect a desired amount of the light, so that the efficiency of the bright state of the total internal reflection display is low, and an overall performance of the total internal reflection display is reduced.

SUMMARY

An aspect of the present disclosure is related to a total internal reflection display.

According to one embodiment of the present disclosure, a total internal reflection display includes a sub-pixel, a reflecting layer, at least one first stereoscopic electrode and a display medium layer. The sub-pixel is defined by a color filter and a black matrix disposed adjacently to the color filter. The reflecting layer is located beneath the sub-pixel. The first stereoscopic electrode is located beneath the black matrix of the sub-pixel. The width of the first stereoscopic electrode is less than the width of the black matrix. The display medium layer is located between the sub-pixel and the reflecting layer. The height of the first stereoscopic electrode is greater than half of the thickness of the display medium layer.

In one embodiment of the present disclosure, the total internal reflection display further includes a first dielectric layer and a thin-film transistor substrate. The first dielectric layer surrounds the first stereoscopic electrode. The thin-film transistor substrate has a first transparent electrode. The first transparent electrode is electrically connected with the first stereoscopic electrode.

In one embodiment of the present disclosure, a width of the reflecting layer is substantially equal to a width of the color filter of the sub-pixel.

In one embodiment of the present disclosure, the reflecting layer is located on the thin-film transistor substrate and has a top surface and a sidewall, and the top surface and the sidewall of the reflecting layer and a top surface of the thin-film transistor substrate define a stepped surface.

In one embodiment of the present disclosure, the total internal reflection display further includes a first lens layer, a second transparent electrode and a second dielectric layer. The first lens layer is disposed between the sub-pixel and the display medium layer. The second transparent electrode is located between the first lens layer and the display medium layer. The second dielectric layer is located between the second transparent electrode and the display medium layer.

In one embodiment of the present disclosure, the total internal reflection display further includes a blocking wall and a second stereoscopic electrode. The blocking wall is disposed between the second dielectric layer and the thin-film transistor substrate and is located outside the sub-pixel. The second stereoscopic electrode is disposed in the blocking wall.

In one embodiment of the present disclosure, the first dielectric layer covers the top surface and the sidewall of the reflecting layer, and the first dielectric layer and the first lens layer are separated apart.

In one embodiment of the present disclosure, the total internal reflection display further includes a third dielectric layer. The third dielectric layer covers the top surface and the sidewall of the reflecting layer. The first dielectric layer is in contact with the first lens layer and is separated from the thin-film transistor substrate.

In one embodiment of the present disclosure, the width of the first stereoscopic electrode is in a range from 1 μm to 32 μm.

In one embodiment of the present disclosure, the total internal reflection display further includes a second lens layer and a third transparent electrode. The second lens layer is located between the thin-film transistor substrate and the reflecting layer. An air gap is located between the second lens layer and the reflecting layer. The third transparent electrode is located between the sub-pixel and the thin-film transistor substrate.

In one embodiment of the present disclosure, the width of the reflecting layer is greater than the width of the third transparent electrode.

In one embodiment of the present disclosure, the first dielectric layer extends onto the third transparent electrode, and the third transparent electrode and the sub-pixel are separated apart.

In one embodiment of the present disclosure, the first dielectric layer extends onto the third transparent electrode, and the third transparent electrode and the first dielectric layer are separated apart.

In one embodiment of the present disclosure, the total internal reflection display further includes a fourth dielectric layer. The fourth dielectric layer covers the third transparent electrode. The display medium layer is located between the fourth dielectric layer and the first dielectric layer.

In the aforementioned embodiments of the present disclosure, the total internal reflection display has the reflecting layer, the first stereoscopic electrode and the display medium layer. Because the height of the first stereoscopic electrode is greater than half of the thickness of the display medium layer, when the first stereoscopic electrode is positive, charged black particles in the display medium layer may move onto the first stereoscopic electrode having the sufficient height, which may improve an efficiency of the first stereoscopic electrode in absorbing the charged black particles, to allow more light to enter the reflecting layer to improve a reflecting effect. In addition, the width of the first stereoscopic electrode may be reduced by increasing the height of the first stereoscopic electrode such that the width of the first stereoscopic electrode is less than the width of the black matrix of the sub-pixels, which may increase an aperture ratio of the total internal reflection display, thereby increasing reflectivity of a bright state of the total internal reflection display.

DETAILED DESCRIPTION

Figure 1:
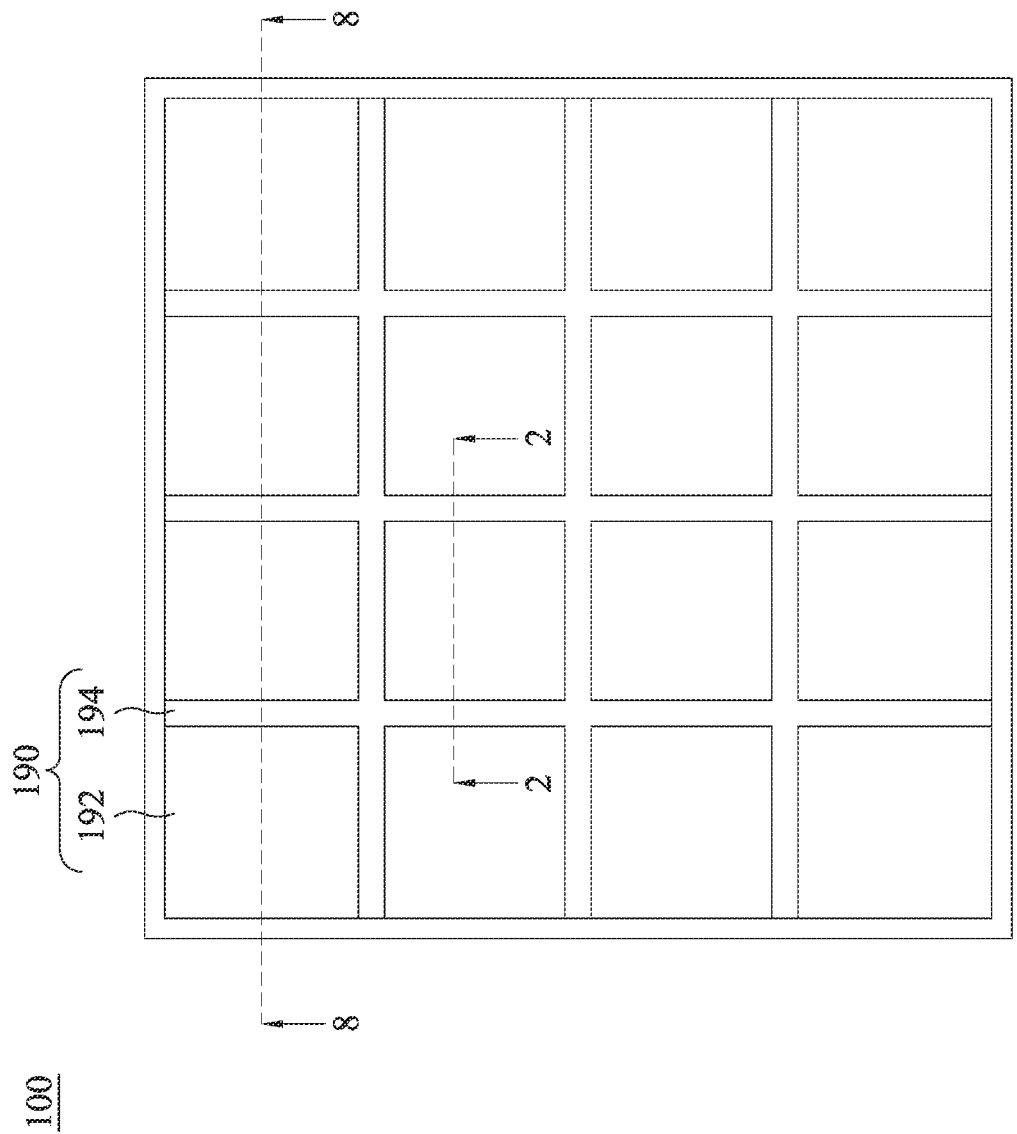
FIG. 1 illustrates a top view of a sub-pixel of a total internal reflection display according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
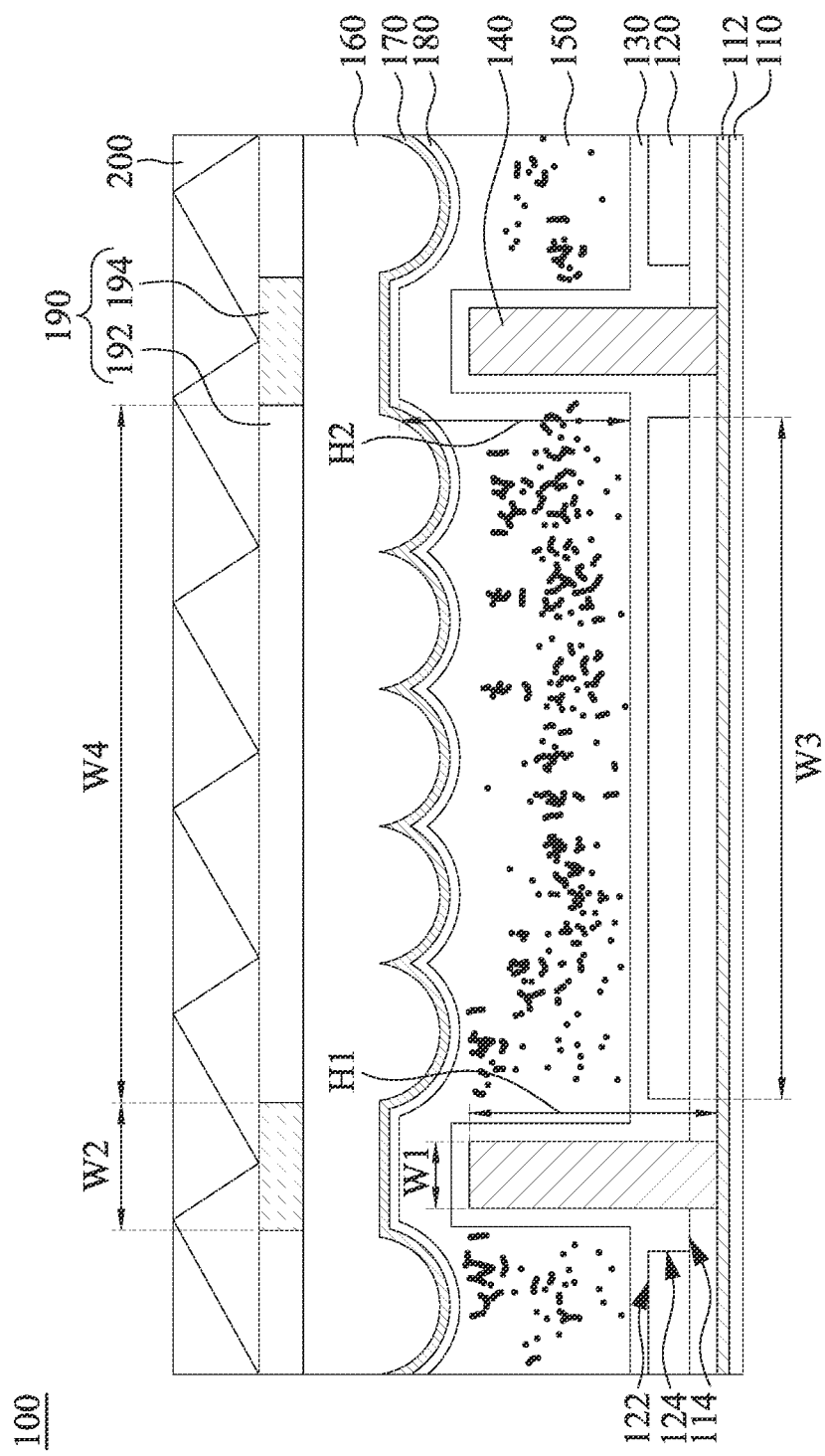
FIG. 2 illustrates a cross-sectional view of the total internal reflection display of FIG. 1 along a line 2-2.

FIG. 1 illustrates a top view of a sub-pixel 190 of a total internal reflection display 100 according to one embodiment of the present disclosure. FIG. 2 illustrates a cross-sectional view of the total internal reflection display 100 of FIG. 1 along a line 2-2. Referring to both FIG. 1 and FIG. 2, the total internal reflection display 100 includes the sub-pixel 190, a reflecting layer 120, at least one first stereoscopic electrode 140, and a display medium layer 150. The sub-pixel 190 is defined by a color filter 192 and a black matrix 194 disposed adjacently to the color filter 192. A front light module 200 may be disposed above the sub-pixel 190. The reflecting layer 120 is located beneath the color filter 192 of the sub-pixel 190, and the first stereoscopic electrode 140 is located beneath the black matrix 194 of the sub-pixel 190, and the number of the first stereoscopic electrode 140 is not limited in this regard. A width W1 of the first stereoscopic electrode 140 is less than a width W2 of the black matrix 194 of the sub-pixel 190, and a width W3 of the reflecting layer 120 is substantially equal to a width W4 of the color filter 192 of the sub-pixel 190. The display medium layer 150 is located between the sub-pixel 190 and the reflecting layer 120. For example, the display medium layer 150 has low refractive index mediums and charged black particles. The charged black particles have negative characteristics and may move in the low refractive index mediums. In addition, a height H1 of the first stereoscopic electrode 140 is greater than half of a thickness H2 of the display medium layer 150.

In one embodiment, the total internal reflection display 100 further includes a first dielectric layer 130 and a thin-film transistor substrate 110. The first dielectric layer 130 is located between the display medium layer 150 and the thin-film transistor substrate 110. The first dielectric layer 130 surrounds the first stereoscopic electrode 140. The thin-film transistor substrate 110 has a first transparent electrode 112. The first transparent electrode 112 is electrically connected with the first stereoscopic electrode 140 to provide a voltage to the first stereoscopic electrode 140. The reflecting layer 120 is located on a top surface 114 of the thin-film transistor substrate 110 and has a top surface 122 and a sidewall 124. The top surface 122 and the sidewall 124 of the reflecting layer 120 and the top surface 114 of the thin-film transistor substrate 110 define a stepped surface.

Specifically, the total internal reflection display 100 has the reflecting layer 120, the first stereoscopic electrode 140 and the display medium layer 150. Because the height H1 of the first stereoscopic electrode 140 is greater than half of the thickness H2 of the display medium layer 150, when the first stereoscopic electrode 140 is positive, the charged black particles in the display medium layer 150 may move onto the first stereoscopic electrode 140 having the height H1, which may improve an efficiency of the first stereoscopic electrode 140 in absorbing the charged black particles, to allow more light L (will be described in FIG. 4) to enter the reflecting layer 120 to improve a reflecting effect. In addition, the width W1 of the first stereoscopic electrode 140 may be reduced by increasing the height H1 of the first stereoscopic electrode 140 such that the width W1 of the first stereoscopic electrode 140 is less than the width W2 of the black matrix 194 of the sub-pixels 190, which may increase an aperture ratio of the total internal reflection display 100, thereby increasing reflectivity of a bright state of the total internal reflection display 100.

Figure 3:
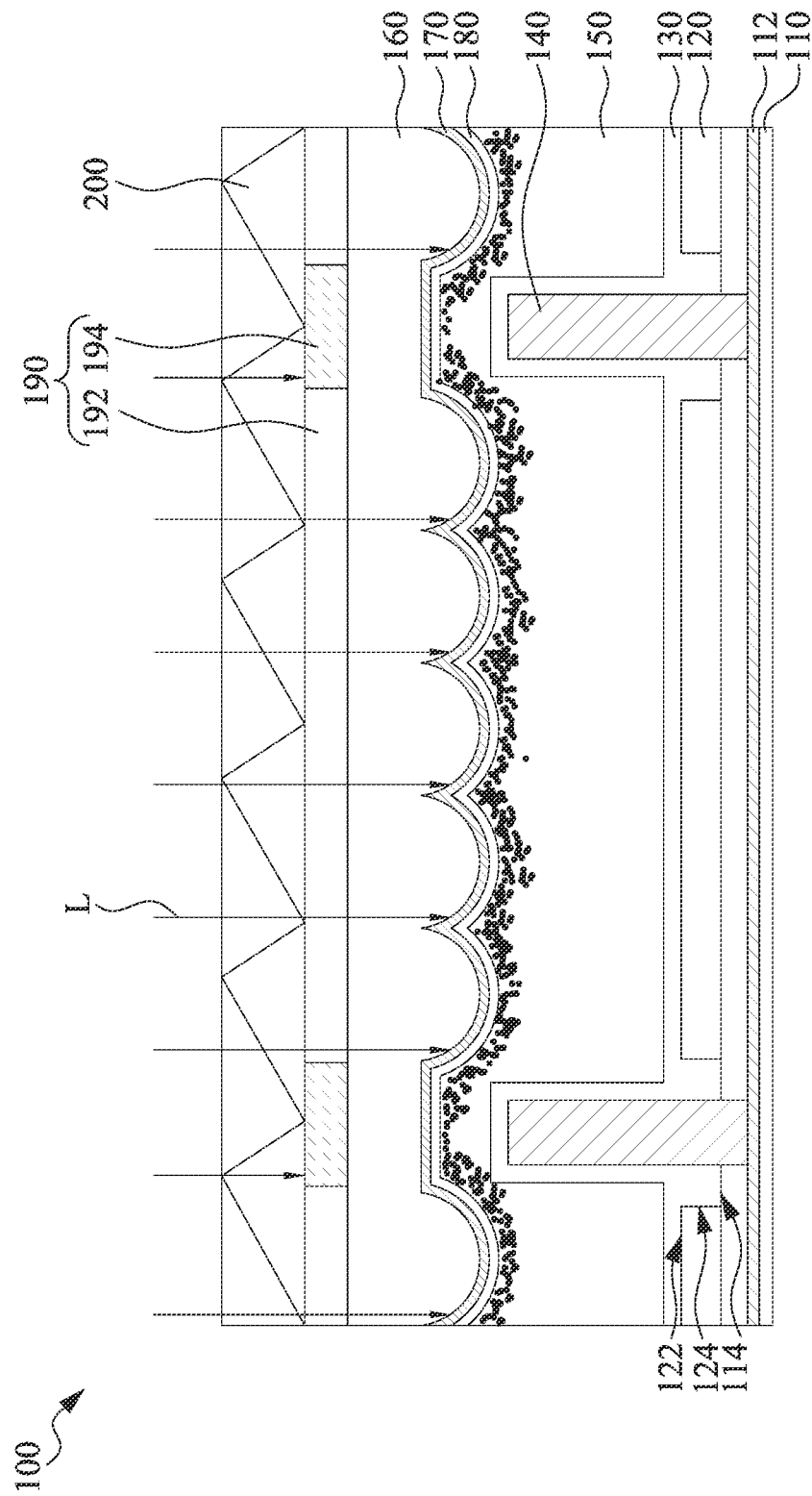
FIG. 3 and FIG. 4 illustrate a schematic view of operating the total internal reflection display of FIG. 2.
Figure 4:
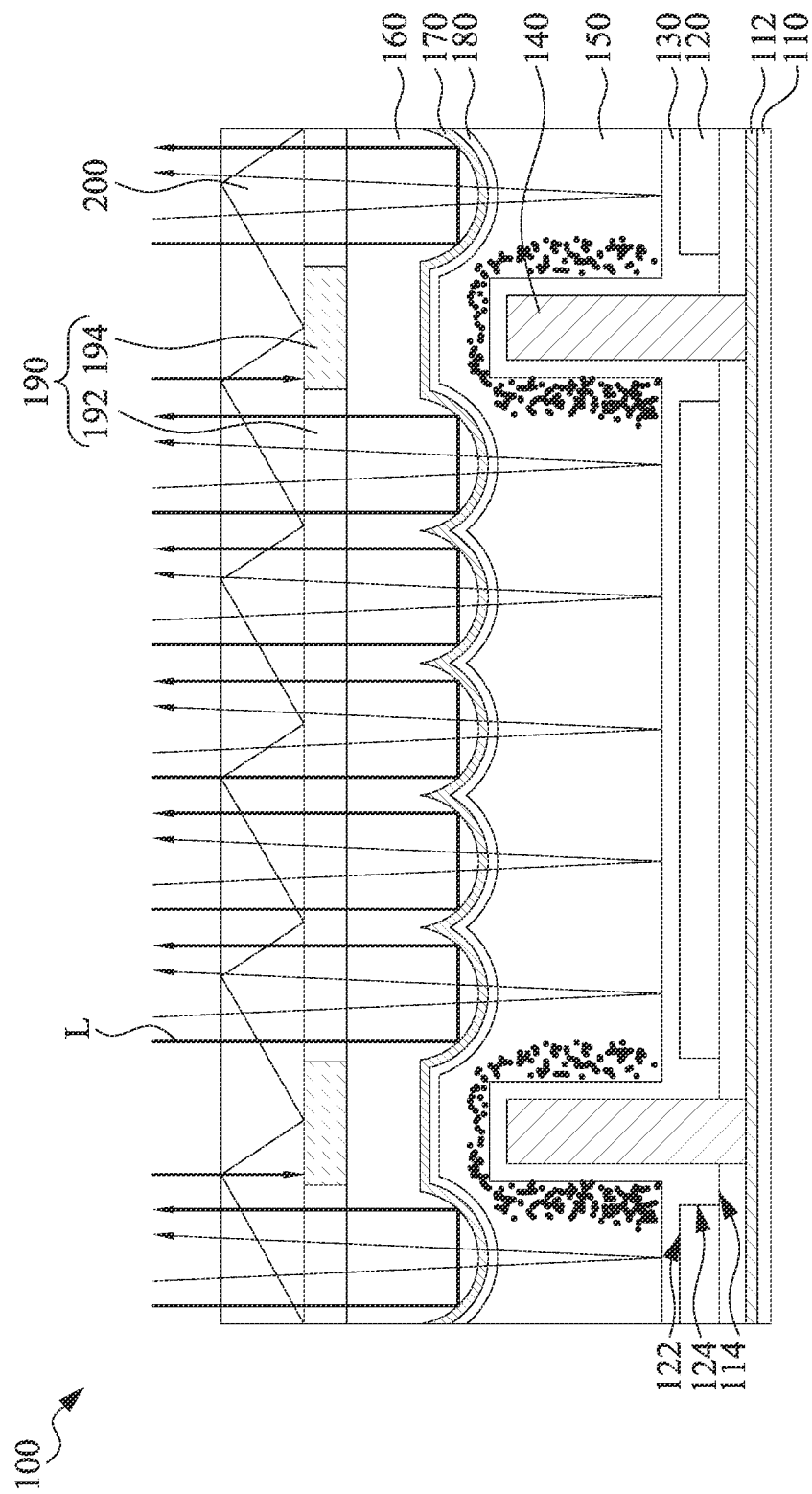

FIG. 3 and FIG. 4 illustrate a schematic view of operating the total internal reflection display 100 of FIG. 2. Referring to FIG. 3, the total internal reflection display 100 further includes a first lens layer 160, a second transparent electrode 170 and a second dielectric layer 180. The first lens layer 160 is disposed between the sub-pixel 190 and the display medium layer 150. For example, the first lens layer 160 may be a high refractive index lens. The second transparent electrode 170 is located between the first lens layer 160 and the display medium layer 150. The second dielectric layer 180 is located between the second transparent electrode 170 and the display medium layer 150. The first dielectric layer 130 extends to cover the top surface 122 and the sidewall 124 of the reflecting layer 120, and the first dielectric layer 130 and the first lens layer 160 are separated apart. In one embodiment, when the second transparent electrode 170 located between the first lens layer 160 and the second dielectric layer 180 provides a positive voltage and the first transparent electrode 112 of the thin-film transistor substrate 110 provides a negative voltage, the charged black particles in the display medium layer 150 move onto the second dielectric layer 180 to absorb the light L, which may be viewed as a dark state of the total internal reflection display 100.

Referring to FIG. 4, when the second transparent electrode 170 located between the first lens layer 160 and the second dielectric layer 180 provides the negative voltage and the first transparent electrode 112 of the thin-film transistor substrate 110 provides the positive voltage, the charged black particles in the display medium layer 150 move onto the first dielectric layer 130 which is located under the black matrix 194 of the sub-pixel 190 (for example, located on the first dielectric layer 130 disposed along the first stereoscopic electrode 140), the light L is reflected on the first lens layer 160 and the reflecting layer 120, which may be viewed as a bright state of the total internal reflection display 100. Because the charged black particles in the display medium layer 150 move onto the first dielectric layer 130 which is located under the black matrix 194, a proportion of the charged black particles staying on the first dielectric layer 130 which is located under the color filter 192 may be reduced, thereby increasing a reflectivity of the bright state of the total internal reflection display 100.

It is to be noted that the connection relationship of the aforementioned elements will not be repeated. In the following description, other types of total internal reflection display will be described.

Figure 5:
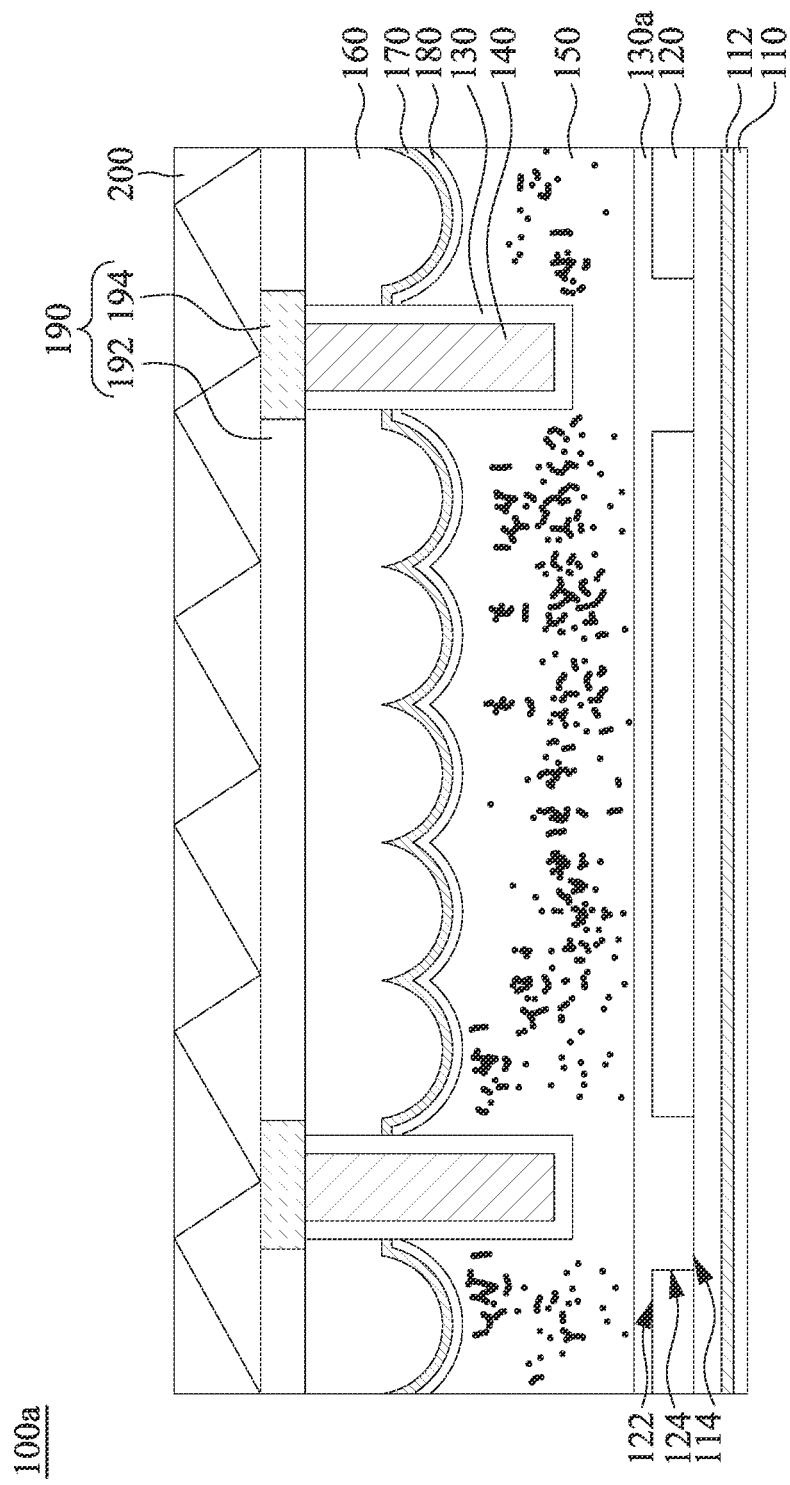
FIG. 5 illustrates a cross-sectional view of a total internal reflection display according to another embodiment of the present disclosure.

FIG. 5 illustrates a cross-sectional view of a total internal reflection display 100a according to another embodiment of the present disclosure. Referring to FIG. 5, the difference between this embodiment and the embodiment shown in FIG. 2 is that the first dielectric layer 130 is in contact with the first lens layer 160, and the first dielectric layer 130 and the first stereoscopic electrode 140 are separated from the thin-film transistor substrate 110. The total internal reflection display 100a further includes a third dielectric layer 130a covering the top surface 122 and the sidewall 124 of the reflecting layer 120 and the top surface 114 of the thin-film transistor substrate 110. The first stereoscopic electrode 140 may be electrically connected with the first transparent electrode 112 of the thin-film transistor substrate 110 by wiring. In one embodiment, when the second transparent electrode 170 provides the positive voltage and the first stereoscopic electrode 140 electrically connected with the first transparent electrode 112 provides the negative voltage, the charged black particles in the display medium layer 150 move onto the second dielectric layer 180, which may be viewed as the dark state of the total internal reflection display 100a. When the second transparent electrode 170 provides the negative voltage and the first stereoscopic electrode 140 electrically connected with the first transparent electrode 112 provides the positive voltage, the charged black particles in the display medium layer 150 move onto the first dielectric layer 130 (for example, move onto the first dielectric layer 130 disposed along the first stereoscopic electrode 140), which may be viewed as the bright state of the total internal reflection display 100a.

Figure 6:
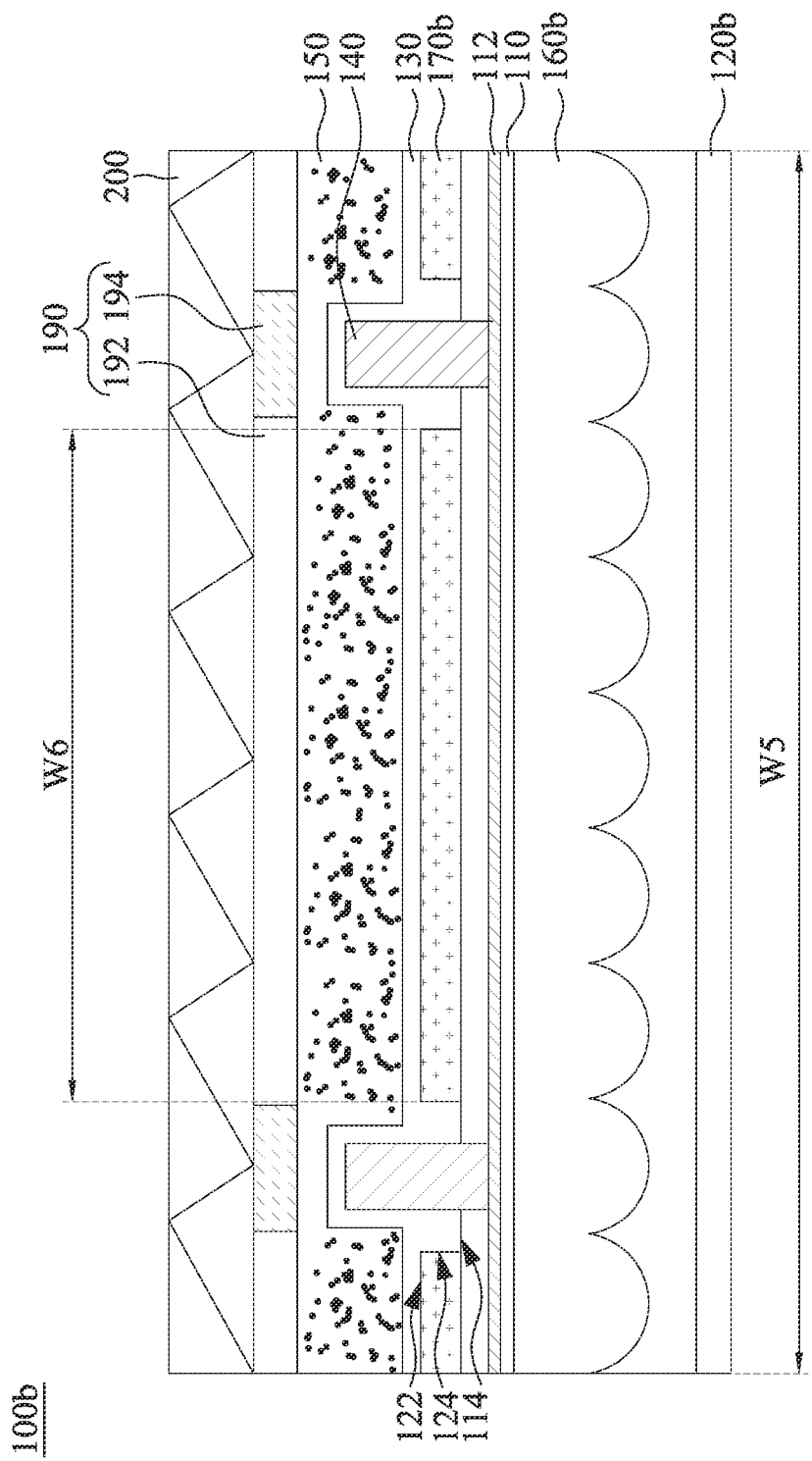
FIG. 6 illustrates a cross-sectional view of a total internal reflection display according to another embodiment of the present disclosure.

FIG. 6 illustrates a cross-sectional view of a total internal reflection display 100b according to another embodiment of the present disclosure. Referring to FIG. 6, the difference between this embodiment and the embodiment shown in FIG. 2 is that the total internal reflection display 100b does not have the first lens layer 160, the second transparent electrode 170, and the second dielectric layer 180 shown in FIG. 2, and the total internal reflection display 100b further includes the second lens layer 160b and the third transparent electrode 170b. The second lens layer 160b is located between the thin-film transistor substrate 110 and the reflecting layer 120b. The low refractive index medium may be located between the second lens layer 160b and the reflecting layer 120b. For example, an air gap may be located between the second lens layer 160b and the reflecting layer 120b, and a width W5 of the reflecting layer 120b is greater than a width W6 of the third transparent electrode 170b. In addition, the third transparent electrode 170b is located between the display medium layer 150 and the thin-film transistor substrate 110. The third transparent electrode 170b and the sub-pixel 190 are separated apart, and the first dielectric layer 130 extends onto the third transparent electrode 170b.

In one embodiment, when the third transparent electrode 170b provides the positive voltage and the first stereoscopic electrode 140 electrically connected with the first transparent electrode 112 provides the negative voltage, the charged black particles in the display medium layer 150 move onto the first dielectric layer 130 above the third transparent electrode 170b (for example, move onto the first dielectric layer 130 disposed along the first stereoscopic electrode 140), which may be viewed as the dark state of the total internal reflection display 100b. When the third transparent electrode 170b provides the negative voltage and the first stereoscopic electrode 140 electrically connected with the first transparent electrode 112 provides the positive voltage, the charged black particles in the display medium layer 150 move onto the first dielectric layer 130 under the black matrix 194 of the sub-pixel 190, which may be viewed as the bright state of the total internal reflection display 100b.

Figure 7:
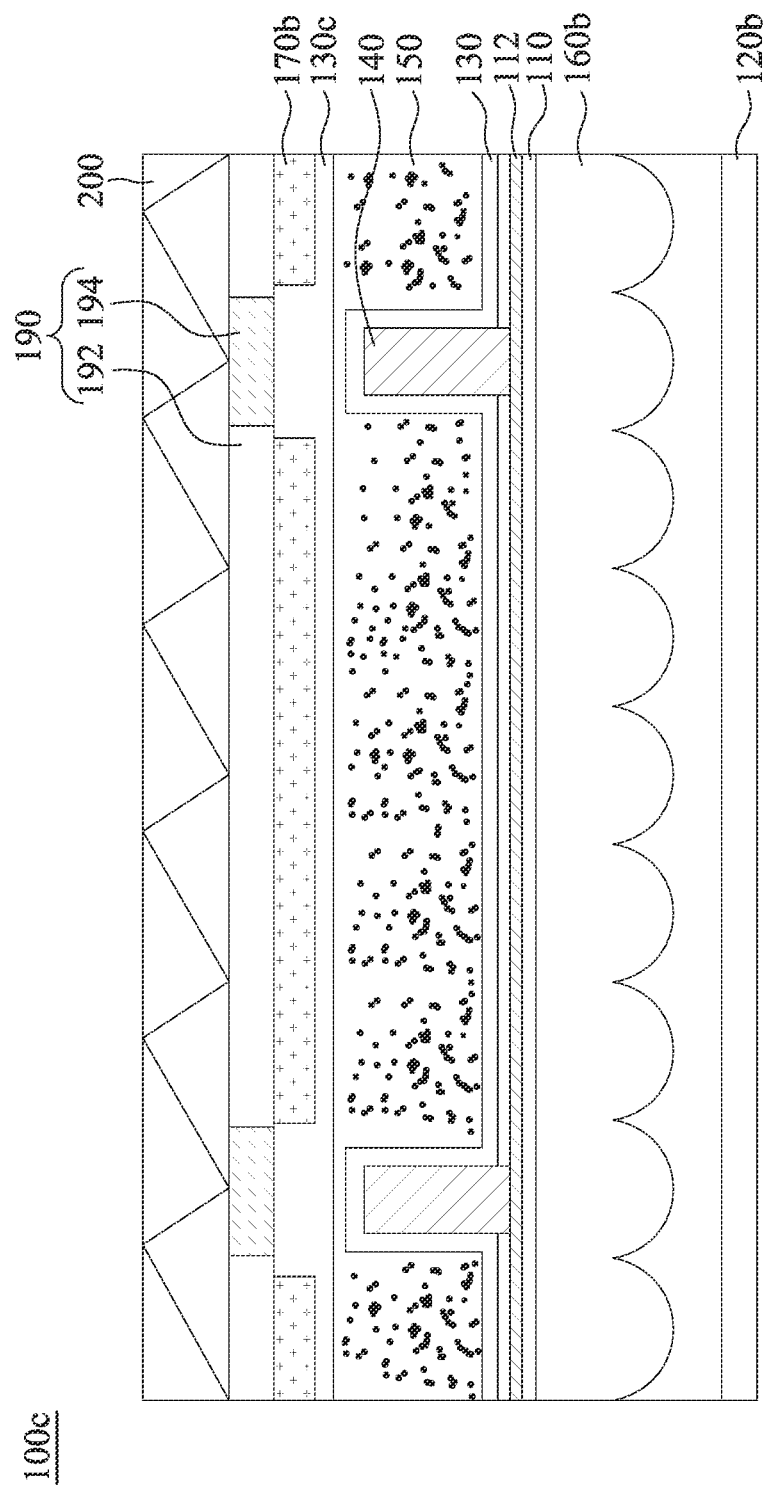
FIG. 7 illustrates a cross-sectional view of a total internal reflection display according to another embodiment of the present disclosure.

FIG. 7 illustrates a cross-sectional view of a total internal reflection display 100c according to another embodiment of the present disclosure. Referring to FIG. 7, the difference between this embodiment and the embodiment shown in FIG. 6 is that the first dielectric layer 130 covers the thin-film transistor substrate 110, and the third transparent electrode 170b is located between the sub-pixel 190 and the display medium layer 150, and the third transparent electrode 170b and the first dielectric layer 130 are separated apart. In addition, the total internal reflection display 100c further includes a fourth dielectric layer 130c. The fourth dielectric layer 130c covers the third transparent electrode 170b, and the display medium layer 150 is located between the fourth dielectric layer 130c and the first dielectric layer 130.

In one embodiment, when the third transparent electrode 170b provides the positive voltage and the first stereoscopic electrode 140 electrically connected with the first transparent electrode 112 provides the negative voltage, the charged black particles in the display medium layer 150 move onto the fourth dielectric layer 130c, which may be viewed as the dark state of the total internal reflection display 100c. When the third transparent electrode 170b provides the negative voltage and the first stereoscopic electrode 140 electrically connected with the first transparent electrode 112 provides the positive voltage, the charged black particles in the display medium layer 150 move onto the first dielectric layer 130 under the black matrix 194 of the sub-pixel 190 (for example, move onto the first dielectric layer 130 disposed along the first stereoscopic electrode 140), which may be viewed as the bright state of the total internal reflection display 100c.

Figure 8:
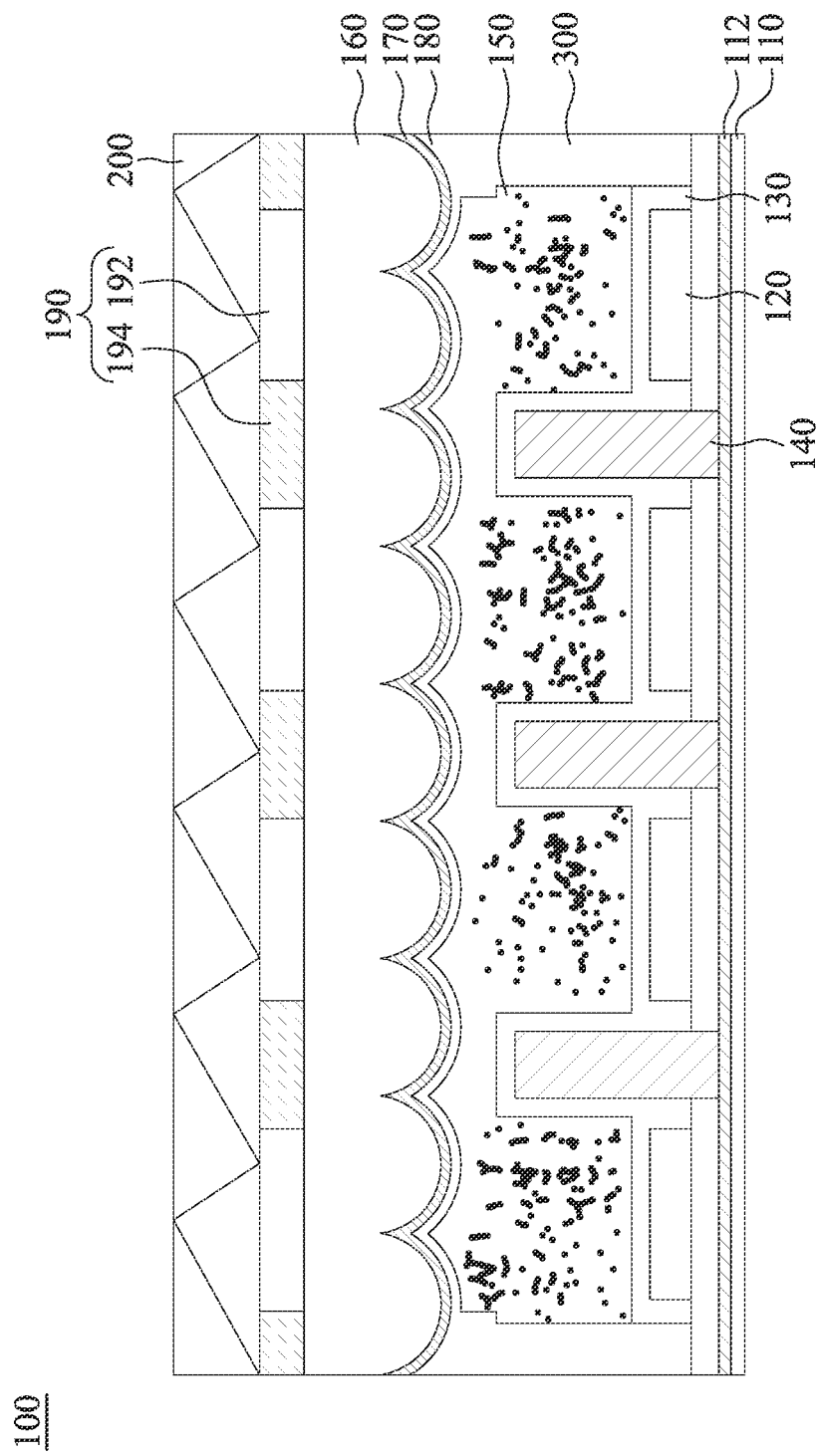
FIG. 8 illustrates a cross-sectional view of the total internal reflection display of FIG. 1 along a line 8-8.

FIG. 8 illustrates a cross-sectional view of the total internal reflection display 100 of FIG. 1 along a line 8-8. In detail, FIG. 8 illustrates a peripheral area of the sub-pixel 190 of the total internal reflection display 100. Referring to FIG. 8, the total internal reflection display 100 further includes a blocking wall 300. The blocking wall 300 is disposed between the second dielectric layer 180 and the thin-film transistor substrate 110, and the blocking wall 300 is located at a periphery of the sub-pixel 190. The blocking wall 300 may provide a separation effect such that the charged black particles in the display medium layer 150 may move in the low refractive index mediums of the display medium layer 150.

Figure 9:
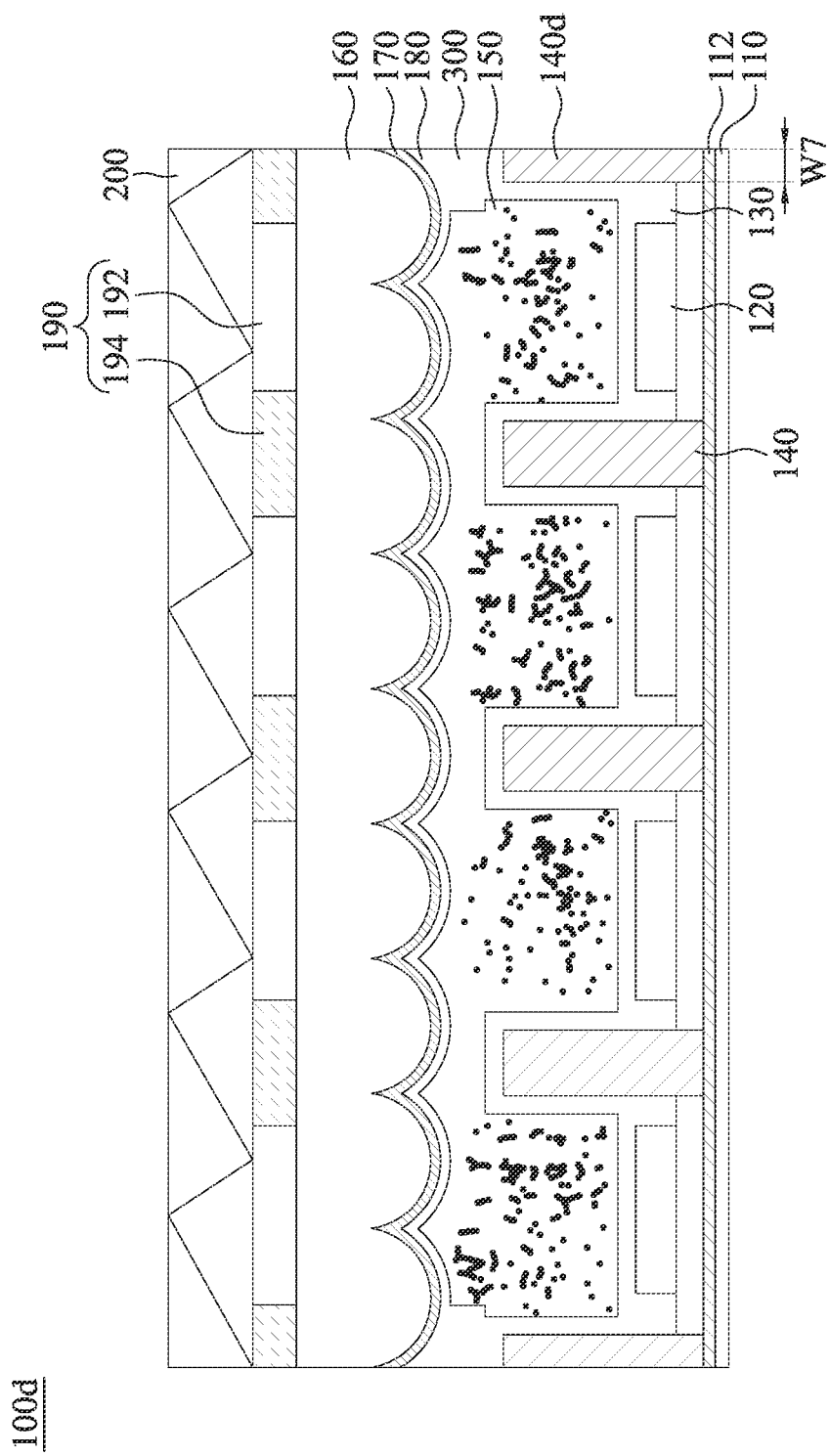
FIG. 9 illustrates a cross-sectional view of a total internal reflection display according to another embodiment of the present disclosure.

FIG. 9 illustrates a cross-sectional view of a total internal reflection display 100d according to another embodiment of the present disclosure. Referring to FIG. 9, the difference between this embodiment and the embodiment shown in FIG. 8 is that the total internal reflection display 100d further includes a second stereoscopic electrode 140d. The second stereoscopic electrode 140d is disposed in the blocking wall 300. FIG. 9 shows half of a width W7 of the second stereoscopic electrode 140d. In one embodiment, the width W1 (see FIG. 2) of the first stereoscopic electrode 140 is in a range from 1 µm to 32 µm, and twice the half of the width W7 of the second stereoscopic electrode 140d is in a range from 1 µm to 32 µm. The width W1 of the first stereoscopic electrode 140 and twice the half of the width W7 of the second stereoscopic electrode 140d may determine the aperture ratio of the total internal reflection display 100d. When the width W1 of the first stereoscopic electrode 140 and the half of the width W7 of the second stereoscopic electrode 140d is narrower, the wider reflecting layer 120 may be disposed to increase the aperture ratio of the total internal reflection display 100d and the reflectivity of the bright state of the total internal reflection display 100d.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A total internal reflection display, comprising:
   a sub-pixel defined by a color filter and a black matrix disposed adjacently to the color filter;
   a reflecting layer located beneath the sub-pixel;
   at least one first stereoscopic electrode located beneath the black matrix of the sub-pixel, wherein a width of the first stereoscopic electrode is less than a width of the black matrix;
   a display medium layer located between the sub-pixel and the reflecting layer, wherein a height of the first stereoscopic electrode is greater than half of a thickness of the display medium layer;
   a first dielectric layer surrounding the first stereoscopic electrode; and
   a thin-film transistor substrate having a first transparent electrode, wherein the first transparent electrode is electrically connected with the first stereoscopic electrode.

2. The total internal reflection display of claim 1, wherein a width of the reflecting layer is substantially equal to a width of the color filter of the sub-pixel.

3. The total internal reflection display of claim 1, wherein the reflecting layer is located on the thin-film transistor substrate and has a top surface and a sidewall, and the top surface and the sidewall of the reflecting layer and a top surface of the thin-film transistor substrate define a stepped surface.

4. The total internal reflection display of claim 3, further comprising:
   a first lens layer disposed between the sub-pixel and the display medium layer;
   a second transparent electrode located between the first lens layer and the display medium layer; and
   a second dielectric layer located between the second transparent electrode and the display medium layer.

5. The total internal reflection display of claim 4, further comprising:
   a blocking wall disposed between the second dielectric layer and the thin-film transistor substrate and located outside the sub-pixel; and
   a second stereoscopic electrode disposed in the blocking wall.

6. The total internal reflection display of claim 4, wherein the first dielectric layer covers the top surface and the sidewall of the reflecting layer, and the first dielectric layer and the first lens layer are separated apart.

7. The total internal reflection display of claim 4, further comprising:
   a third dielectric layer covering the top surface and the sidewall of the reflecting layer, wherein the first dielectric layer is in contact with the first lens layer and separated from the thin-film transistor substrate.

8. The total internal reflection display of claim 1, wherein the width of the first stereoscopic electrode is in a range from 1 µm to 32 µm.

9. The total internal reflection display of claim 1, further comprising:
   a second lens layer located between the thin-film transistor substrate and the reflecting layer, wherein an air gap is located between the second lens layer and the reflecting layer; and
   a third transparent electrode located between the sub-pixel and the thin-film transistor substrate.

10. The total internal reflection display of claim 9, wherein a width of the reflecting layer is greater than a width of the third transparent electrode.

11. The total internal reflection display of claim 9, wherein the first dielectric layer extends onto the third transparent electrode, and the third transparent electrode and the sub-pixel are separated apart.

12. The total internal reflection display of claim 9, wherein the first dielectric layer extends onto the third transparent electrode, and the third transparent electrode and the first dielectric layer are separated apart.

13. The total internal reflection display of claim 12, further comprising:
   a fourth dielectric layer covering the third transparent electrode, wherein the display medium layer is located between the fourth dielectric layer and the first dielectric layer.

* * * * *